United States Patent [19]
Ezaki et al.

[11] Patent Number: 5,822,425
[45] Date of Patent: Oct. 13, 1998

[54] METHODS OF TRANSMITTING AND RECORDING TELEVISION SIGNALS WITH COPY GENERATING RESTRICTION INFORMATION AND RECORDING APPARATUS THEREFOR

[75] Inventors: Tadashi Ezaki, Tokyo; Koichiro Watanabe, Saitama, both of Japan

[73] Assignee: Sony Corporation, Tokyo, Japan

[21] Appl. No.: 733,770

[22] Filed: Oct. 18, 1996

[30] Foreign Application Priority Data

Oct. 26, 1995 [JP] Japan ................................. 7-302050

[51] Int. Cl.$^6$ ................................................. H04N 7/167
[52] U.S. Cl. ............................. 380/5; 360/60; 386/94; 380/20
[58] Field of Search ................... 380/3, 5, 20; 360/60; 386/94

[56] References Cited

U.S. PATENT DOCUMENTS

| | | | |
|---|---|---|---|
| 4,775,901 | 10/1988 | Nakano | 360/60 |
| 5,418,853 | 5/1995 | Kanota et al. | 380/5 |
| 5,627,655 | 5/1997 | Okamoto et al. | 386/94 |
| 5,668,873 | 9/1997 | Yamauchi | 380/5 |
| 5,673,357 | 9/1997 | Shima | 386/94 |

*Primary Examiner*—Stephen C. Buczinski
*Attorney, Agent, or Firm*—Frommer Lawrence & Haug LLP; William S. Frommer

[57] ABSTRACT

Information for imposing copy generation restrictions is superimposed in the format of an XDS signal that is according to the standard of a closed caption broadcast so as to permit performance of copy generation restriction in response to such information without the need to change the structure of a TV receiver. Copy Generation Restriction Management System (CGMS) information is inserted in the format of the XDS signal defined in association with the closed caption signal superimposed on an analog TV signal at the 21-st line in a vertical blanking interval. The XDS signal is composed of a clock run-in interval, a start bit code, and a 16-bit digital signal which is divided into two bytes respectively representing first and second characters. The XDS signal and the CGMS information can be recognized from the start bit code and the first and/or second character. A recording apparatus recognizes the CGMS information on the 21-st line of a second or even-numbered field so as to perform the corresponding copy generation restriction.

15 Claims, 13 Drawing Sheets

Fig. 1
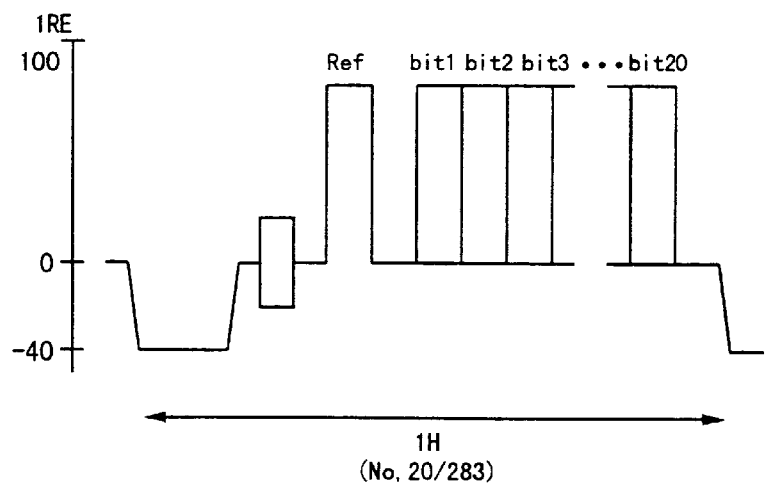
Fig. 2
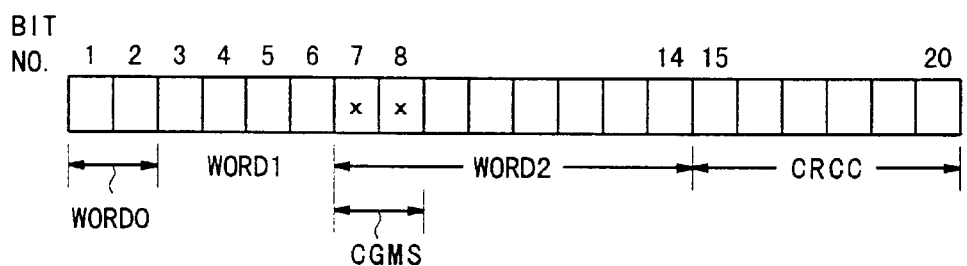
Fig. 3
| BIT 7 | BIT 8 | DEFINITION |
|---|---|---|
| 1 | 1 | COPY DISABLED |
| 1 | 0 | FIRST COPY GENERATION ENABLED |
| 0 | 1 | RESERVED |
| 0 | 0 | COPY ENABLED |

Fig. 5

| Character 1 | | Character 2 | | | | | | | | | | | | | | | |
|---|---|---|---|---|---|---|---|---|---|---|---|---|---|---|---|---|---|
| | | 0 | | 1 | | 2 | | 3 | | 4 | | 5 | | 6 | | 7 | |
| | | 0 | F 0 | F 0 | F | F 0 | F | F 0 | F | F 0 | F | F 0 | F | F 0 | F | F 0 | F |
| 00 | NOP | | | | | | | | | | | | | | | | |
| 01 | Start (current) | | | | | | | | | | | | | | | | |
| 02 | Cont. (current) | | | | | | | | | | | | | | | | |
| 03 | Start (future) | | | | | | | | | | | | | | | | |
| 04 | Cont. (future) | | | | | | | | | | | | | | | | |
| 05 | Start (channel) | | | | | | | | | | | | | | | | |
| 06 | Cont. (channel) | | | | | | | | | | | | | | | | |
| 07 | Start (miscellaneous) | | | | | | | | | | | | | | | | |
| 08 | Cont. (miscellaneous) | | | | | | | | | | | | | | | | |
| 09 | Start (public) | | | | | | | | | | | | | | | | |
| 0A | Cont. (public) | | | | | | | | | | | | | | | | |
| 0B | Start (reserved) | | | | | | | | | | | | | | | | |
| 0C | Cont. (reserved) | | | | | | | | | | | | | | | | |
| 0D | Start (undefined) | | | | | | | | | | | | | | | | |
| 0E | Cont. (undefined) | | | | | | | | | | | | | | | | |
| 0F | End (all) | | | | | | | | | | | | | | | | |

CGMS (FIG. 8)
CGMS (FIG. 7)
CGMS (FIG. 6)

Fig. 12

|     | MSB | | | | | | | LSB |
|-----|---|---|---|---|---|---|---|---|
| PC0 | 0 | 1 | 1 | 0 | 0 | 0 | 0 | 1 |
| PC1 | CGMS | | COPY SOURCE | | COPY GENERATION | | SS | |
| PC2 | RECORD START | 1 | RECORD MODE | | 1 | DISPLAY | | |
| PC3 | FF | FS | FC | IL | ST | SC | BCSYS | |
| PC4 | 1 | CATEGORY | | | | | | |

Fig. 13

|     | MSB | | | | | | | LSB |
|-----|---|---|---|---|---|---|---|---|
| PC0 | 0 | 1 | 0 | 1 | 0 | 0 | 0 | 1 |
| PC1 | CGMS | | COPY SOURCE | | COPY GENERATION | | SS | |
| PC2 | RECORD START | RECORD END | RECORD MODE | | 1 | 1 | 1 | 1 |
| PC3 | DRF | SPEED | | | | | | |
| PC4 | 1 | CATEGORY | | | | | | |

METHODS OF TRANSMITTING AND RECORDING TELEVISION SIGNALS WITH COPY GENERATING RESTRICTION INFORMATION AND RECORDING APPARATUS THEREFOR

BACKGROUND OF THE INVENTION

1. Field of the Invention

The present invention relates generally to methods of transmitting and recording television signals and to a recording apparatus therefor, and, in particular, is directed to such methods and apparatus by which copy generation restriction information is transmitted and recorded for selectively enabling/disabling the recording of an associated television signal.

2. Description of the Related Art

A VCR (Video Cassette tape Recorder) that records a television signal in the format of a digital signal, a digital video disc and the like are going to be mass marketed. Such devices will accomplish high quality recording/reproducing operations by which the copying of proprietary programming may be anticipated. In order to protect copyrights of programs, a copy generation restricting function is required.

To do that, a system using an identification signal, which will be hereinafter referred to as a VBI signal, has been proposed. Such VBI signal is inserted into a vertical blanking interval so as to enable/disable the copy operation of an analog signal in the format of 525 line/60 field. The VBI signal is inserted into the 20th horizontal region or line in the first or odd field and the 283rd horizontal region or line in the second or even field of a vertical blanking interval of a video signal of one frame.

The waveform of the VBI signal is shown in FIG. 1 to include a two-bit reference and a 20-bit (bits 1 to 20) digital signal which are inserted into a valid video signal region following a horizontal synchronous signal and a color burst signal on each of the 20th and 283rd lines. The level of the reference is defined as 70 IRE. The binary levels of the 20-bit digital signal are defined as 0 IRE and 70 IRE. This digital signal is encoded as the VBI signal. The clock frequency fc of the reference and of the digital signal is fc=fsc/8≠447 kHz, where fsc is the frequency of the chrominance subcarrier. The 20-bit digital signal includes an ID signal of a video signal with a different aspect ratio and a transmission method.

A system has been proposed for transmitting copy generation restriction control information using the above-described VBI signal and is referred to as the Copy Generation Restriction Management System—Analog (CGMS-A). In this system, the structure of the transmission signal is the same as the structure of the VBI signal shown in FIG. 1. only the code assignment of the 20-bit digital signal is changed. As shown in FIG. 2, the 20-bit digital signal is composed of a 14-bit information section and a 6-bit CRC code section for detecting an error of the 14-bit information. The first and second bits of the 14-bit information section compose a word 0. The third through sixth bits of the 14-bit information section compose a word 1, and the seventh through fourteenth bits compose a word 2.

The word 0 (bits 1 and 2) is information concerning the transmission format of the video signal. The code assignment of the word 0 is the same as the code assignment of the VBI signal. The word 1 (bits 3 to 6) is a header for assigning information to be transmitted with the word 2. When the word 1 is (0000), this represents that information for a digital recording apparatus is transmitted with the word 2. For example, when the word 1 is (0000), copy generation restriction information for a copy operation performed between a digital recording apparatus and a digital reproducing apparatus is transmitted with the word 2. In such case, the first two bits (bits 7 and 8) of the 8-bit word 2 represent whether or not copying is to be enabled and to what extent, as shown in FIG. 3. When information is transmitted with the word 1 being (0000), two or more frames of information are transmitted in at least two seconds, and the copy generation restriction information is transmitted by the bits 7 and 8.

As a copy protecting technology for an analog VCR, a system has been proposed in which a pseudo synchronous signal with a large level is inserted as a synchronous signal equivalent to an AGC reference pulse, and the AGC is operated in response to such pseudo synchronous signal so that a very small amplitude of the reproduced signal results to prevent a normal reproducing The system for transmitting the CGMS information (hereinafter simply referred to as CGMS) in the above-described VBI signal is not used in a TV broadcast, for example, a digital TV broadcast receiving apparatus, such as, a set top box or an IRD (Integrated Receiver Decoder). Thus, to restrict a digital apparatus such as a digital VCR from recording the TV signal, the receiving apparatus should be replaced with one consistent with the video ID. In addition, a system that uses the level of the AGC reference pulse cannot restrict the copy generation, but prohibits only the copy operation. Moreover, a VCR that uses a different AGC system cannot then perform copy protection.

OBJECTS AND SUMMARY OF THE INVENTION

Therefore, it is an object of the present invention to provide a method for transmitting the copy generation restriction information to a conventional receiving apparatus and for executing the copy generation restriction in accordance with the received copy generation restriction information, a method for recording the copy generation restriction information with the associated TV signal, and a recording apparatus therefor.

Another object is to provide a method and apparatus, as aforesaid, by which a television signal broadcast with copy generation restriction information may be recorded in a digital VCR, and then the resulting recorded television signal and copy generation restriction information can be reproduced in a digital VCR, if permitted by the copy generation restriction information, while preserving the protection afforded thereby.

In accordance with an aspect of the present invention, when transmitting a television signal having secondary information, such as, a text, superimposed on a predetermined horizontal region of a vertical blanking interval in a digital data format, copy generation restriction information is inserted in association with the television signal in at least part of the predetermined horizontal region at which the secondary information has been superimposed.

In accordance with another aspect of the present invention, when recording a television signal having secondary information, such as, a text, superimposed on a predetermined horizontal region of a vertical blanking interval in a digital data format, such copy generation restriction information is detected and the copy generation restriction corresponding to the detected copy generation restriction information is executed.

In accordance with still another aspect of the present invention, a recording apparatus for recording a television signal having secondary information, such as, a text, superimposed at a predetermined horizontal region of a vertical blanking interval in a digital data format and further having copy generation restriction information in association with the television signal inserted in at least part of the predetermined horizontal region at which the secondary information has been superimposed, is provided with a detecting means for detecting the copy generation restriction information, and a controlling means for prohibiting the television signal from being recorded on a record medium when the detected copy generation restriction information indicates that the copy operation is disabled and for recording the television signal and the copy generation -restriction information on the record medium when the detected copy generation restriction information indicates that the copy operation is enabled.

It is a feature of this invention that the copy generation restriction information is desirably superimposed at the 21-st horizontal region of the vertical blanking interval of the second or even field of the TV signal. The foregoing, accords with the XDS format of the closed caption used in the USA. Normally, the set top box or IRD that receives a digital TV broadcast signal has an encoder that outputs a TV signal in such format, so that the copy generation restriction in accordance with this insertion can be accomplished without the need to provide a substitute or additional receiving terminal.

The above, and other objects, features and advantages of the present invention, will become more apparent in light of the following detailed description of best mode embodiments thereof, as illustrated in the accompanying drawings.

BRIEF DESCRIPTION OF THE DRAWINGS

FIG. 1 is a schematic diagram showing a waveform of a VBI signal for use with a standard video signal;

FIG. 2 is a schematic diagram showing a data structure of the VBI signal;

FIG. 3 is a table showing a bit assignment in the case where information for a recording apparatus is transmitted with the VBI signal;

FIG. 5 is a table for explaining a format of an XDS signal that is employed according to an embodiment of the present invention;

FIG. 12 is a schematic diagram showing an example of the structure of digital data for transmitting copy restriction information according to the present invention;

FIG. 13 is a schematic diagram showing another example of the structure of digital data for transmitting copy restriction information according to the present invention;

DETAILED DESCRIPTION OF THE PREFERRED EMBODIMENTS

An embodiment of the present invention will now be described which is particularly adapted for use in the case where a teletext broadcast TV signal, called closed caption in the USA, is received and the received TV signal is recorded by a digital recorder such as a digital VCR. In the USA, a TV receiver should have a closed caption decoder. In addition, when a terminal that receives a digital TV broadcast signal outputs an analog TV signal, the terminal encodes the signal into a closed caption signal.

In the closed caption system, 14-bit data (excluding parity) is inserted into the 21-st line in the vertical blanking interval of each field, that is, each of the odd numbered fields and the even numbered fields. Actually, two language texts are transmitted with the first or odd numbered field, while the second or even numbered field provided for third and fourth language texts is hardly ever used. Thus, a system referred to as extended data service (XDS) has been proposed in which various additional information along with other language closed captions and the texts are superimposed on the 21-st line of the vertical blanking interval of the second or even numbered field (namely, the 284-th line of the frame). In such system, various transmission contents are defined, and the embodiment of the present invention being now described provides a system for transmitting copy generation restriction information with the format of the XDS.

Figure 4:
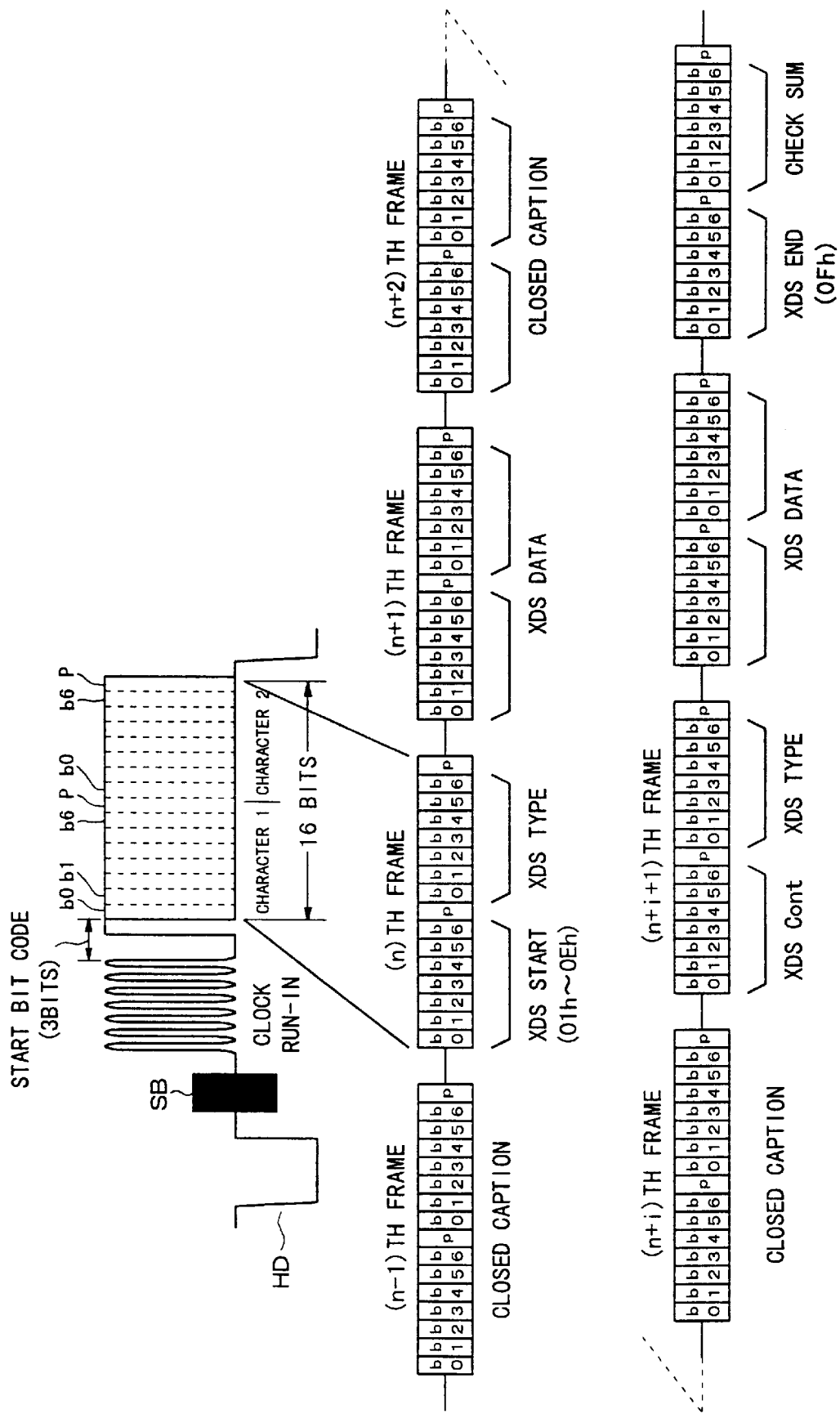
FIG. 4 is a schematic diagram showing an example of a signal format for transmitting copy generation restriction information according to an embodiment of the present invention.

FIG. 4 shows an example of transmission data in the XDS format. More specifically, data as shown in FIG. 4 is superimposed on the 21-st line of the second field (or the 284-th line of the frame) in each of the (n−1)-th, n-th, (n+1)-th, (n+2)-th frames, and so forth. Closed caption data is superimposed on the 284-th line of the (n−1)-th frame and the (n+2)-th to (n+1)-th frames. Since the closed caption data has a higher precedence than the XDS data, the XDS data is superimposed on the 21-st line of the second field of each frame in which the closed caption data has not been superimposed. Thus, in FIG. 4, the XDS format signal is shown to be superimposed on the 21-st line of the second field of the (n)-th, (n+1)-th, (n+i+1)-th, (n+i+2)-th, and (n+i+3)-th frames.

Figure 6:
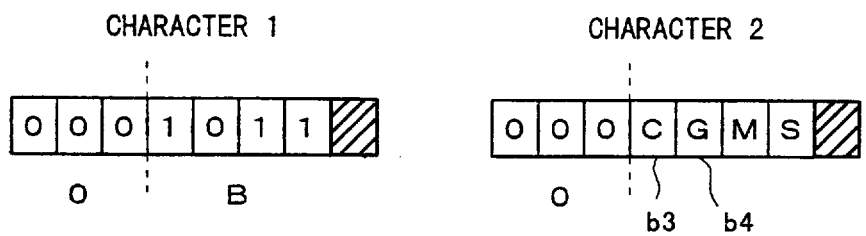
FIG. 6 is a schematic diagram to which reference is made in explaining an example of a method for transmitting copy generation restriction information in the format of the XDS signal.
Figure 7:
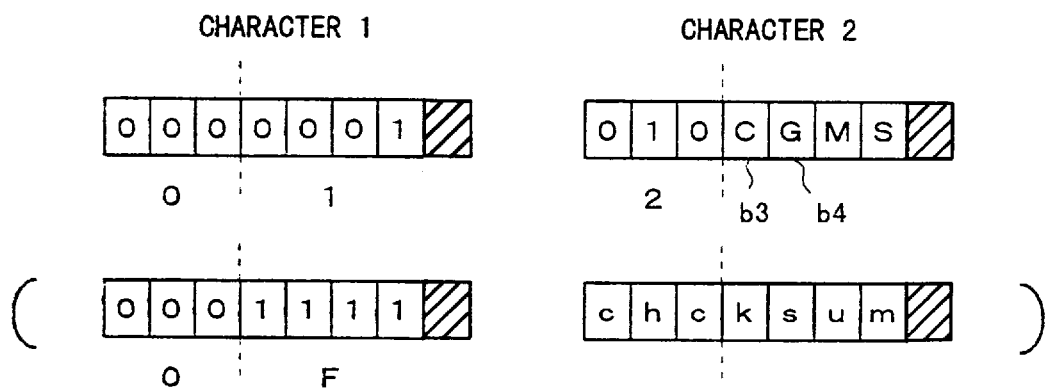
FIG. 7 is a schematic diagram to which reference is made in explaining another example of a method for transmitting the copy generation restriction information in the format of the XDS signal.
Figure 8:
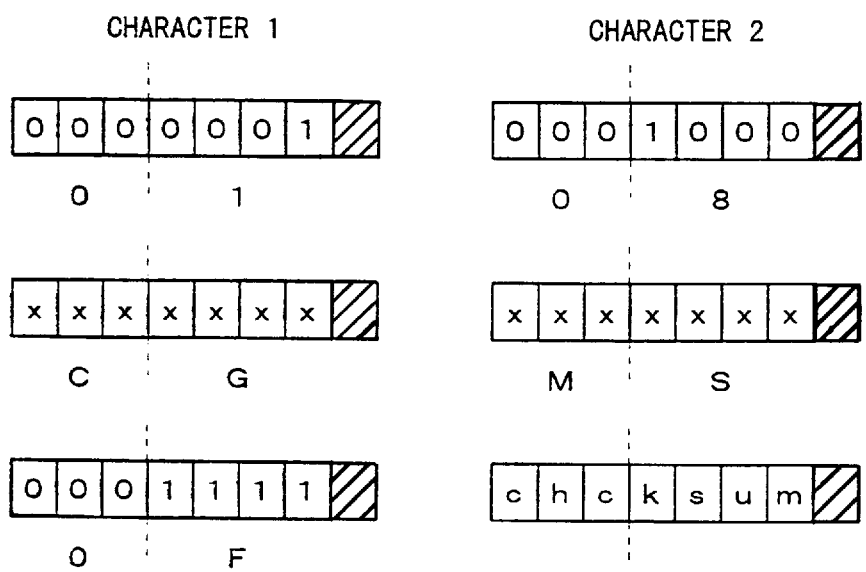
FIG. 8 is a schematic diagram to which reference is made in explaining a further example of a method for transmitting the copy generation restriction information in the format of the XDS signal.

The XDS signal is superimposed on the TV signal with the waveform shown on FIG. 4 for the n-th frame. In the picture interval preceded by the horizontal synchronous signal HD and the burst signal SB, there are formed a clock run-in interval of seven cycles for acquiring PLL, followed by a 3-bit start code (001) and then by a 2-byte (16 bit) digital signal. Such digital signal is divided into character 1 (one byte) (referred to as a class code) and character 2 (one byte) (referred to as a type code). Each of characters 1 and 2 is composed of seven data bits b0 to b6 and one parity bit p thereof. As shown in FIGS. 6–8, the 7-bit data is divided into three bits (b0 to b2) and four bits (b3 to b6). They have values in the range from 00h to 7Fh (where h represents hexadecimal notation).

FIG. 5 shows definitions of XDS data. In FIG. 5, meanings of the values 00h to 0Fh of the character 1 are defined. The value 00h of the character 1 represents NOP (No Operation). The values 01h to 0Fh of the character 1 variously represent start, continuation, and stop of the XDS signal, as hereinafter further described. Signals of the character 1 and the character 2 are not displayed on the screen. The values 10h to 1Fh of the character 1 are control codes for controlling the sizes of the closed caption and text, colors thereof, and so forth. The values 20h to 7Eh of the character 1 are standard letters.

More specifically in the definitions of the character 1 of the XDS shown in FIG. 5, 01h is "Start (current)", that is, represents the start of information concerning a currently broadcast program; 02h is "Cont. (current)", that is, represents the continuation of information concerning a currently broadcast program; 03h is "Start (future)", that is, represents the start of a program that will be broadcast; 04h is "Cont. (future)", that is, represents the continuation of information concerning a program that will be broadcast; 05h is "Start (channel)", that is, represents the start of information concerning the channel; 06h is "Cont. (channel)", that is, represents the continuation of information concerning the channel; 07h is "Start (miscellaneous)", that is, represents the start of miscellaneous or other information, for example, time information of the region; and 0Fh of the character 1 is "End (all)", that is, represents the end of the XDS.

As an example of the transmission signal shown in FIG. 4, the character 1 of the n-th frame may be a code that represents the start of the XDS (such as, one of 01h, 03h, 05h, 07h, 09h, 0Bh and 0Dh). The character 2 of the n-th frame is a type code of the XDS. When the type code in character 2 represents time information, data in the (n+1)-th frame and the (n+i+2)-th frame represent time. When the XDS data is suspended by the closed caption data, as in the (n+2)-th and (n+i)-th frames in FIG. 4, data that represents the continuation is inserted as character 1 into the (n+i+1)-th frame. The end code (0Fh) that represents the last of the data sequence of the XDS is inserted as character 1 into the (n+i+3)-th frame. A check sum for detecting an error of the XDS data sequence is inserted as the character 2 after the end code in the (n+i+3)-th frame.

In FIG. 5, the hatched regions represents the range of data defined as the regular standard. The character 2 is divided into three bits (b0 to b2) and four bits (b3 to b6). The three bits have values in the range from 0 to 7. The four bits have values in the range from 0 to F. In FIG. 5, when the character 1 is 01h, a region of 08h, 0Ah, 0Bh, 18h to 1Fh, 2xh (where x represents don't care), and 3xh to 7xh is an undefined region in which the contents of the codes have not been defined. When the character 1 is 05h, the contents of 01h to 03h of the character 2 have been defined. In accordance with the present invention, copy generation restriction information is transmitted as a part of the XDS signal. Of course, previously defined codes cannot be used for that purpose. Next, several practical examples of transmitting the copy generation restriction information (CGMS) as a part of the XDS signal will be described.

In the example shown in FIG. 6, (0001011), that is, 0Bh in the hexadecimal notation, which is shown to mean "Start (reserved)" in FIG. 5, is transmitted as the character 1, and the copy generation restriction information (CGMS) is transmitted as the character 2. To transmit the CGMS, as shown in FIG. 5, for example 01h to 0Fh can be used. However, for the CGMS, only two bits of character 2 defined similarly to the VBI signal shown in FIG. 3 need to be used. Thus, with only the two bits b3 and b4 of the character 2 shown in FIG. 5, the CGMS can be transmitted. When the character 1 is 0Bh, the start of the XDS can be recognized therefrom. In addition, the CGMS can be recognized as the character 2. In the example shown in FIG. 6, the CGMS can be transmitted with each frame.

In the example shown in FIG. 7, 01h, which is indicated to mean "Start (current)" in FIG. 5, is used as the character 1 and the CGMS is transmitted as the character 2. When the transmission of the CGMS is stopped in the middle, 02h is used as the character 2. As shown in FIG. 5, 20h to 2Fh can be used to transmit the CGMS. When two bits are used to transmit the CGMS, for example, bits b3 and b4 of the character 2 shown in FIG. 7 can be used. With the value 01h of the character 1, the XDS can be recognized. With the value 2xh of the character 2, the CGMS can be recognized. In the example shown in FIG. 7, if necessary, the end code (0Fh) and check sum are added. In this example, the CGMS can be transmitted with every frame or with only one of every two frames.

In the example shown in FIG. 8, as with the example shown in FIG. 7, 01h is used as the character 1 and 08h, representing undefined data, is used as the character 2. 08h represents that the remaining data is the CGMS. The remaining data (the character 1 and the character 2) can be assigned as the CGMS. However, only two bits of this data are required for transmitting the CGMS. The end code (0Fh) and the check sum are added after the data. Thus, in this example, the CGMS can be transmitted with one of every three frames.

As is clear from FIG. 5, since there are many regions in which the XDS has not been defined, the CGMS can be transmitted in the XDS in other than the above-described formats.

Figure 9A:
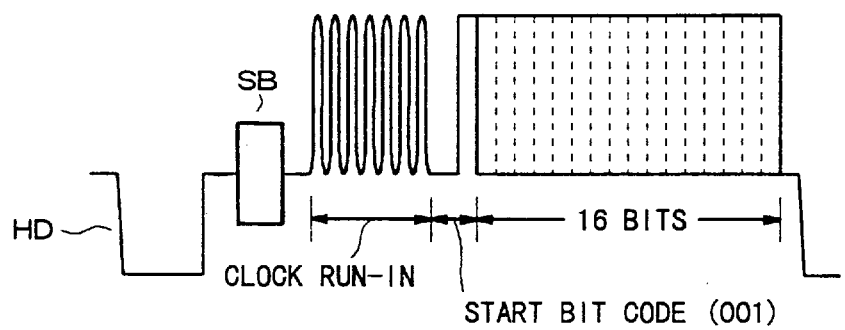
FIGS. 9A and 9B are schematic diagrams to which reference will be made in explaining a method for transmitting the copy generation restriction information in response to a start bit code of the format of the XDS signal.
Figure 9B:
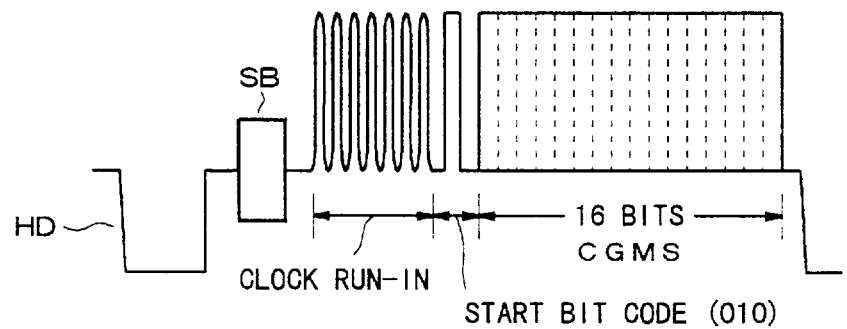

In addition to the 14-bit data of the XDS, the start bit code preceding the 14-bit data can be used for transmitting the CGMS. In other words, as shown in FIG. 9A, in the case of the closed caption and the XDS, the start bit code following the clock run-in interval is (001). On the other hand, as shown in FIG. 9B, the start bit code may be changed to (010) for indicating that the following data contains CGMS information. In that case, with the remaining 16 bits, the CGMS is transmitted. It should be noted that the CGMS transmission method using data of an undefined region of the XDS and the CGMS transmission method in which the start bit code is changed, as in FIG. 9B, may be used in combination.

The method for performing the copy generation restriction by means of the CGMS being transmitted as above, and an apparatus for performing such method and which includes a digital VCR will now be described with reference to FIGS. 10A and 10B. More specifically, a video and/or audio program that has been digitally broadcast is shown on FIG. 10A to be received by an antenna and a tuner and decoder 1 which may be an IRD or set top box, whereupon the program is recorded through an analog interface or a digital interface by a digital VCR 2 which has an XDS decoder 10. The present invention will now be described as applied to the system in which the program is recorded through the analog interface.

Figure 10A:
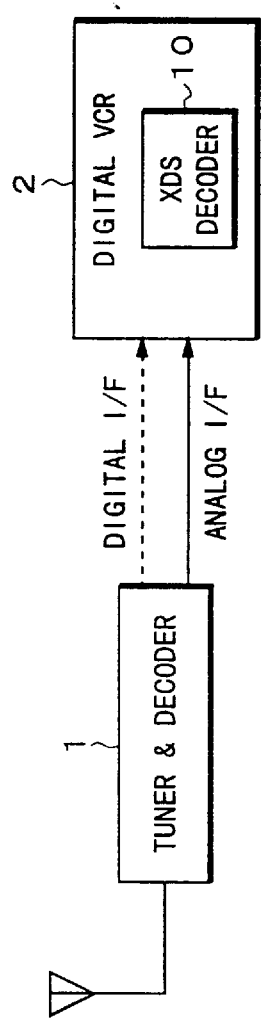
FIGS. 10A and 10B are schematic block diagrams showing apparatus according to an embodiment of the present invention for receiving and recording a digital broadcast program.
Figure 10B:
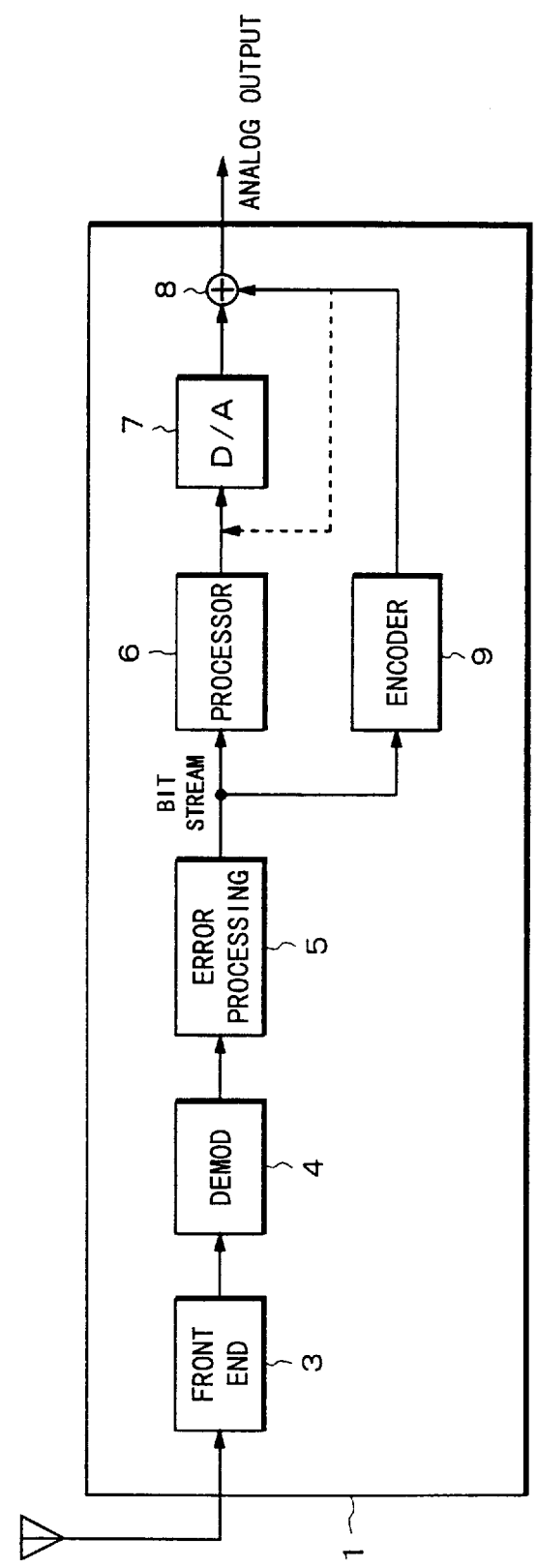

In FIG. 10B, the tuner and decoder 1 is shown to include a front end 3 having the usual tuning circuit and frequency converting circuit. The front end 3 is connected to a demodulating circuit 4 which performs a demodulating operation, for example by the quadrature phase shift keying (QPSK) or quadrature amplitude modulation (QAM) method. The output signal of the demodulating circuit 4 is supplied to a circuit 5 which performs an error correction processing. The error correction processing circuit 5 outputs an MPEG format bit stream which is supplied to a processor 6 and an encoder 9.

The processor 6 performs a decoding process, such as, an MPEG decoding process, and an encoding process for a standard TV signal such as the NTSC system. The processor 6 outputs a digital TV signal supplied to a D/A converter 7 for converting the received digital signal into an analog signal. The analog signal is supplied to a mixing circuit 8. A closed caption signal and an XDS signal (including the CGMS) that are generated in the encoder 9 are supplied to the mixing circuit 8. The mixing circuit 8 superimposes these signals on the analog TV signal from the converter 7. The encoder 9 generates the above-described closed caption signal in response to closed caption information included in the bit stream from the circuit 5. Further, the encoder 9 reads the additional information and the CGMS included in the bit stream and generates the above-described XDS signal including the CGMS. The conventional IRD or set top box may include the encoder 9.

An analog output signal is supplied through the analog interface from the mixing circuit 8 of the tuner and decoder 1 to the digital VCR 2. The digital VCR 2 records the analog signal on a tape. Since the digital VCR 2 has the XDS decoder 10, the digital VCR 2 performs a recording operation while performing the copy generation restriction. In addition, the digital VCR 2 records the CGMS on the tape in the recording format of the digital VCR 2.

Although the present invention has been described above as being applied to a digital broadcast signal, the present invention can also be applied to an analog broadcast signal (ground wave broadcast signal). In the case of the analog broadcast signal, the closed caption signal and the XDS signal (including the CGMS) are superimposed on the analog output signal of the TV receiver. Besides being applied to a TV broadcast signal, the present invention can also be applied to the case where an output signal reproduced from a record medium, such as a digital video disc (DVD) is recorded.

Figure 11:
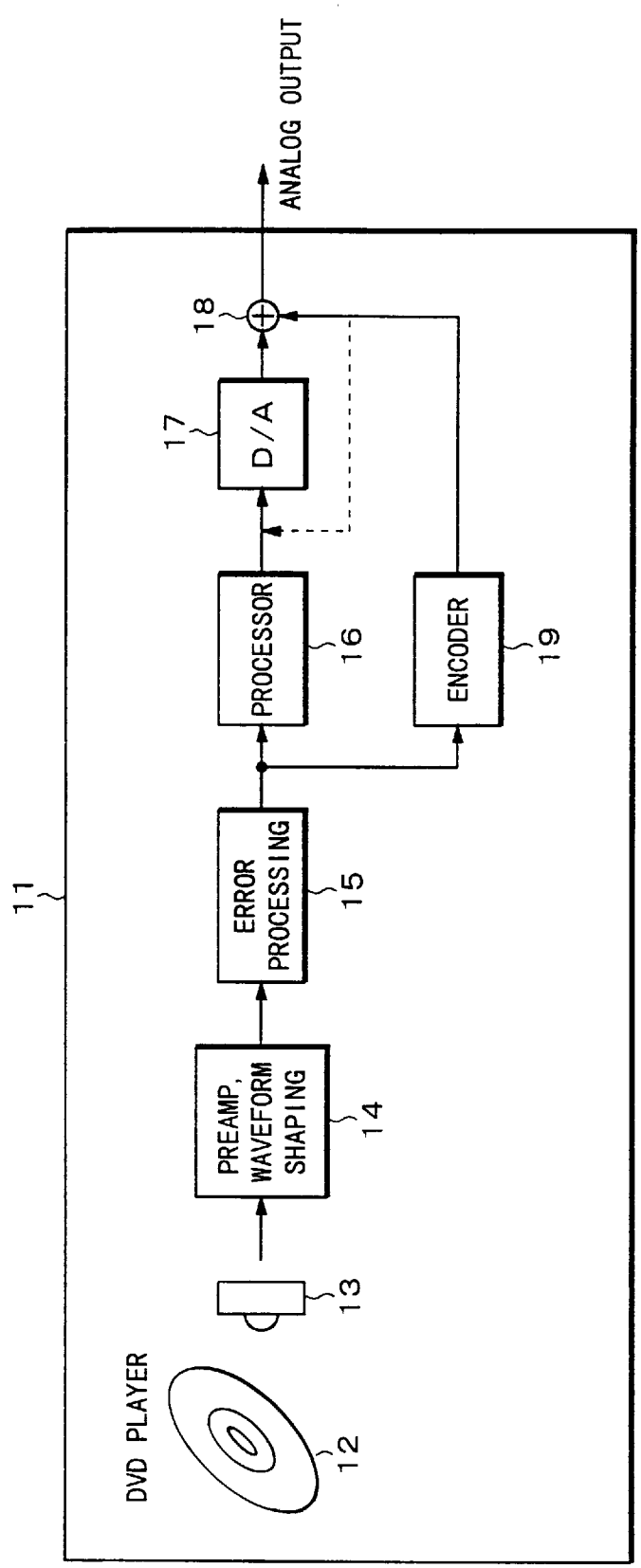
FIG. 11 is a schematic block diagram showing apparatus according to an embodiment of the present invention for recording a signal reproduced from a digital video disc.

FIG. 11 shows an arrangement for use in the case that a reproduced output signal from a DVD (Digital Video Disc) player 11 is to be recorded. In such arrangement, a digital signal that has been compressed and encoded by, for example, the MPEG method is read from the digital video disc 12 by an optical pickup 13. The reproduced signal from the optical pickup 13 is supplied to an error correction processing circuit 15 through a preamplifier and waveform shaping circuit 14. The error correction processing circuit 15 decodes an error correction code and corrects any error thereby indicated in the signal.

Reproduced data is supplied from the error correction processing circuit 15 to a processor 16 that performs a decoding process corresponding to that used with the MPEG method. In addition, the reproduced data is supplied from the error correction processing circuit 15 to an encoder 19. The processor 16 generates a digital signal which is supplied to a D/A converter 17. The D/A converter 17 converts the digital signal into an analog signal which is supplied to a mixing circuit 18. The mixing circuit 18 superimposes a closed caption signal and an XDS signal (including the CGMS) received from the encoder 19 on the analog signal. As in the case of the example described with reference to FIGS. 10A and 10B, the analog output signal of the DVD player 11 is supplied through an analog interface to be recorded on a tape by a digital VCR.

The CGMS included in the TV signal supplied through the analog interface to the digital VCR is recorded as AUX data on the magnetic tape so as to be reproduced therefrom. Next, with reference to FIGS. 12 and 13, examples of the structure of the CGMS are shown. FIG. 12 shows the structure of VAUX data, that is, auxiliary data of a video signal, having a pack header (01100001) (61h) (where h represents hexadecimal notation).

The CGMS is recorded in the high order two bits of PC1, with such two bits defining the CGMS, as follows:

00: COPY ENABLED
01: RESERVED
10: FIRST COPY GENERATION ENABLED
11: COPY DISABLED

Such definition is the same as the definition of record information using the VBI signal, as previously described with reference to FIG. 3, and is the definition of the CGMS used in the embodiment of the present invention being here described.

"COPY SOURCE" of PC1 is defined by the 3rd and 4th bits as follows:

00: COPY BY ANALOG INPUT
01: COPY BY DIGITAL INPUT
10: RESERVED
11: NO INFORMATION

"COPY GENERATION" of PC1 is defined by the 5th and 6th bits, as follows:

00: FIRST GENERATION
01: SECOND GENERATION
10: THIRD GENERATION
11: FOURTH GENERATION

FIG. 13 shows an example of AAUX data, that is, auxiliary data of an audio signal, which includes the CGMS. The AAUX data has a pack header (01010001) (51h). As with the VAUX, information concerning the copy generation restriction is recorded in PC1 of the pack of the AAUX data.

In both the system of FIGS. 10A and 10B that records a program that has been digitally broadcast and received and the system of FIG. 11 that records the reproduced output signal of a digital video disc (DVD), copying can be prohibited in response to the CGMS. However, in practice, only recording operations of the above-described systems of FIGS. 10A and 10B and of FIG. 11 are enabled or disabled for selectively permitting copying of the recorded or broadcast program. Even when the first copy generation is enabled, further digital copying of a digitally broadcast program which has been recorded on a tape by a first digital VCR is sometimes prohibited, that is, the second copy generation is disabled. In this case, the CGMS data of the digital broadcast program is (10) for indicating that the first copy generation is enabled, and the digital VCR used for recording the broadcast program alters and then records the CGMS data as (11) for indicating that any further copy operation is disabled.

Figure 14:
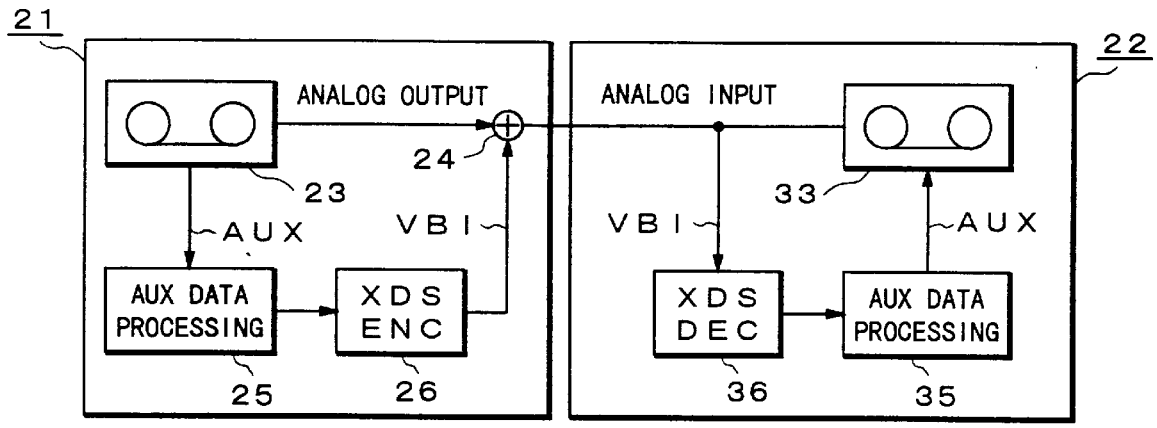
FIG. 14 is a schematic block diagram generally showing the arrangement of apparatus for a copy operation by means of digital VCRs embodying this invention.

FIG. 14 schematically shows a system by which a copy or dubbing operation is performed by means of two helical scan type digital VCRs 21 and 22.

The digital VCR 21 is generally shown to include a tape-and head mechanism 23 composed of a cassette tape and a rotating head by which a digitally modulated television signal recorded on the tape is reproduced. As hereinafter further described but not shown on FIG. 14, the digital VCR 21 processes the reproduced signal to provide an analog video output. In addition, reproduced auxiliary data AUX (VAUX and AAUX) corresponding to a video and/or audio signal recorded on the tape is supplied to an AUX data processing circuit 25. The CGMS representing the copy generation restriction is inserted into such AUX data in the pack structure described above with reference to FIG. 12 or FIG. 13. The AUX data processing circuit 25 reads the CGMS from the AUX data separated from the reproduced data.

The CGMS data read by the AUX data processing circuit 25 is supplied to an XDS encoder 26. The XDS encoder 26 generates an XDS signal which includes the CGMS. The XDS signal is supplied to a mixer 24. The analog video signal that has been obtained from the signal reproduced by the tape head mechanism 23 is also supplied to the mixer 24, and the XDS signal is inserted into a predetermined position of the analog video signal.

The analog output signal from the digital VCR 21 is supplied to a tape and head mechanism 33 of the digital VCR 22 through a record signal processing circuit (not shown on FIG. 14) for recording by the mechanism 33 on a cassette tape. An XDS signal is extracted from the analog input signal, and is supplied to an XDS decoder 36. The XDS decoder 36 reads the information contained in the XDS signal (in particular, the CGMS), decodes the CGMS, and supplies the decoded result to an AUX data processing circuit 35.

The AUX data processing circuit 35 converts the CGMS into a pack structure, rewrites the CGMS data as needed, and supplies the resultant signal to a record signal processing circuit. The tape and head mechanism 33 records the resultant signal on a tape along with the video and/or audio data. In other words, when, for example, the two bits of the CGMS extracted from the XDS signal of the analog input signal are (00) for indicating that further copy operation is enabled without restriction, the CGMS recorded by the digital VCR 22 is not changed, that is, the two bits, of the CGMS are still (00). However, when the two bits of the CGMS as reproduced by the digital VCR 21 are (10) for indicating that only the first copy generation is enabled, the two bits of the CGMS recorded by the digital VCR 22 are changed to (11) for indicating that any further copy operation is disabled. When the two bits of the CGMS as reproduced by the VCR 21 are (11) for indicating that any copy operation is disabled, it is not necessary to change the CGMS, and in that case, recording operation of the digital VCR 22 is prohibited.

Figure 15:
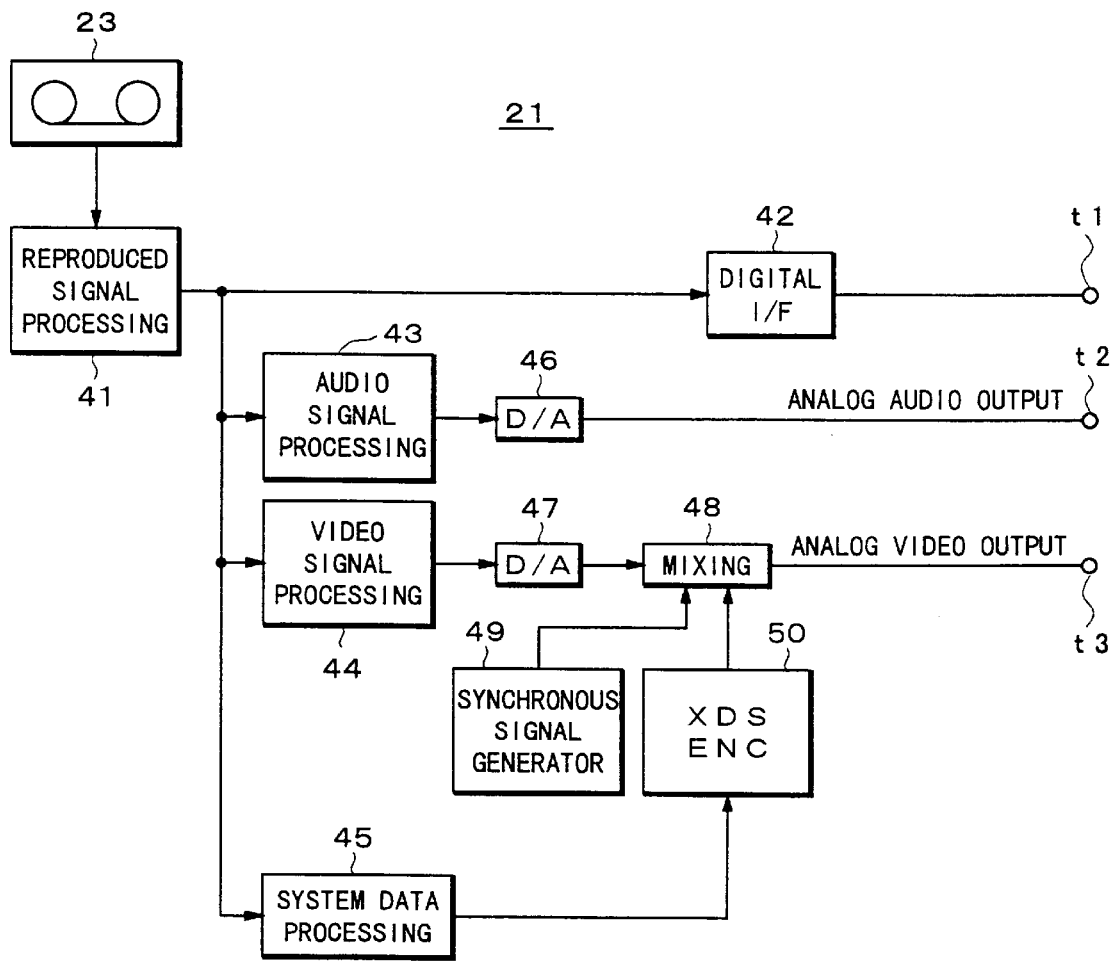
FIG. 15 is a block diagram showing in greater detail the recording side digital VCR for performing a copy operation in FIG. 14.

FIG. 15 shows further details of the reproducing side VCR 21. The tape and head mechanism 23 generally includes the usual head disposed on a rotating drum and a magnetic tape pulled from a cassette and helically wound on the periphery of the drum. The video signal that has been record-processed is recorded on the magnetic tape. For example, the number of helical tracks per frame is 10 (in the case of 525 lines/60 fields) or 12 (in the case of 625 lines/50 fields).

Each helical track has an audio record area, a video record area, and a sub-code record area that are separated from each other. Audio data, video data, and sub-code that are preceded by a synchronous signal are respectively recorded in these areas. In addition to the audio data, AAUX, that is, auxiliary data of the audio signal, is recorded in the audio record area. In addition to the video data, VAUX, that is, auxiliary data of the video signal, is record in the video record area. AAUX, VAUX, and sub-code are written in the above-described common pack structure. As shown in FIGS. 12 and 13, each pack is composed of five bytes. The first byte of each pack is a header, whereas the remaining four bytes are data.

In FIG. 15, a reproduced signal processing circuit 41 receives a reproduced signal from the tape and head mechanism 23. The circuit 41 acts as a reproducing amplifier, a digitally-modulated-signal demodulating circuit, and a data separating circuit that separates audio data, video data, and sub-code. The reproduced signal processing circuit 41 is connected to a digital I/F (interface) 42, an audio signal processing circuit 43, a video signal processing circuit 44, and a system data processing circuit 45. The system data represents data other than video data and audio data. In other words, the system data is VAUX, AAUX, and sub-code.

The digital I/F 42 converts the reproduced digital data (including video data, audio data, and system data) into a bit stream which is supplied to an output terminal t1. The audio signal processing circuit 43 performs error correcting and deshuffling on the separated audio data and the resulting output audio data is supplied to a D/A converter 46. The analog audio output from the D/A converter 46 is supplied to an output terminal t2.

The video signal processing circuit 44 performs error correcting and deshuffling on the separated video data from circuit 41, and the resulting video output data is supplied to a D/A converter 47. The analog video output from the D/A converter 47 is supplied to a mixing circuit 48. A synchronous signal from a synchronous signal generating circuit 49 is also supplied to the mixing circuit 48. In addition, an XDS signal is supplied from an XDS encoder 50 to the mixing circuit 48. The mixing circuit 48 superimposes the synchronous signal and the XDS signal on the analog video signal. The resultant output analog video signal from the mixing circuit 48 is supplied to an output terminal t3.

The system data processing circuit 45, which corresponds to the processing circuit 25 in FIG. 14, processes VAUX, AAUX, and sub-code and generates a control signal (not shown) necessary for a reproducing process. More particularly, the system data processing circuit 45 reads the CGMS recorded in AAUX and VAUX and controls the XDS encoder 50 in accordance with the CGMS. In other words, the CGMS reproduced from the tape by the tape and head mechanism 23 is supplied to the XDS encoder 50 and converted into the format of the XDS signal. The XDS encoder 50 in FIG. 15 corresponds to the XDS encoder 26 shown in FIG. 14.

Figure 16:
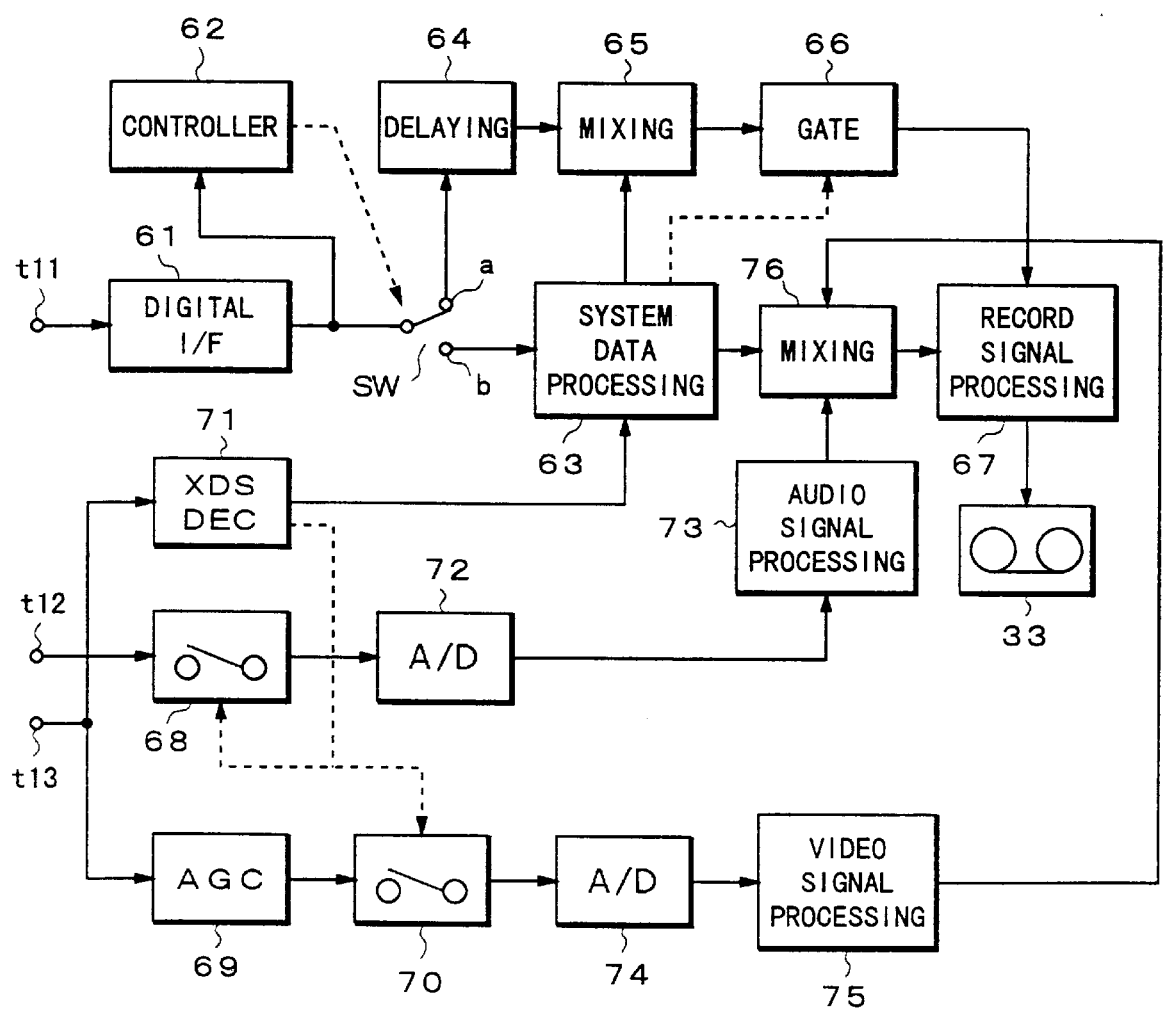
FIG. 16 is a block diagram showing in greater detail the reproducing side digital VCR for performing a copy operation in FIG. 14.

FIG. 16 shows further details of the recording side digital VCR 22. More particularly, the digital VCR 22 is shown to have input terminals t11, t12 and t13 which are connected to the output terminals t1, t2 and t3, respectively, of the reproducing side digital VCR 21. The input terminal t11 is connected to a digital interface (I/F) 61. The digital I/F 61 performs, for example, error detection and format converting by which the bit stream data from terminal t1 is converted into a format suitable for the digital VCR 22.

The output data of the digital I/F 61 is supplied to a controller 62 and through a switch SW to a system data processing circuit 63, which corresponds to the AUX data processing circuit 35 in FIG. 14. Thus, the system data processing circuit 63 rewrites the value of the CGMS reproduced from the tape when such rewriting is indicated to be needed by the reproduced CGMS. The controller 62 controls the switch SW, so that, when the output data of the digital I/F 61 is system data, the input terminal of the switch SW is connected to an output terminal a of the switch. Otherwise, the input terminal of the switch SW is connected to an output terminal b of the switch which is connected to the system data processing circuit 63.

The output terminal a of the switch SW is connected through a delaying circuit 64 to a mixing circuit 65. The output data of the mixing circuit 65 is supplied through a gate circuit 66 to a record signal processing circuit 67. The record signal processing circuit 67 performs, for example, a digital modulating process, and the resulting record signal is supplied from the record signal processing circuit 67 to the tape and head mechanism 33 for recording on a tape by means of the rotating head.

The gate circuit 66 is controlled by a control or gating signal supplied from the system data processing circuit 63. When the CGMS of the digital signal received through the digital I/F 61 is (11) for indicating that the copy operation is disabled, the gate circuit 66 is closed in response to the resulting control or gating signal. Thus, the copy operation is prohibited. On the other hand, when the CGMS is (00) for indicating that the copy operation is enabled, or (10) for indicating that the first copy generation is enabled, the gate circuit 66 is opened by the corresponding control or gating signal and the copy operation is permitted. The gate circuit 66 is opened or closed, as required, for each of the video data and the audio data. Thus, the digital copy operation is performed in accordance with the CGMS reproduced from the tape by the reproducing side digital VCR 21.

The analog audio signal received at the input terminal t12 is supplied to a gate circuit 68. The analog video signal received at the input terminal t13 is supplied to an AGC circuit 69 and to an XDS decoder 71. The output signal of the AGC circuit 69 is supplied to a gate circuit 70. The analog audio signal passing through the gate circuit 68 when the latter has been turned on or opened is supplied to an A/D converter 72. The resulting digital audio signal received from the A/D converter 72 is supplied to an audio signal processing circuit 73. An analog video signal received from the gate circuit 70 when the latter has been turned on or opened is supplied to an A/D converter 74. A digital video signal received from the A/D converter 74 is supplied to a video signal processing circuit 75.

The audio signal processing circuit 73 performs a recording process, for example, a shuffling process and an error-correction-code encoding process, and the resulting record digital audio signal received from the audio signal processing circuit 73 is supplied to a mixing circuit 76. The video signal processing circuit 75 also performs a recording process, for example, a shuffling process and an error-correction-code encoding process, and the resulting record digital video signal received from the video signal processing circuit 75 is also supplied to the mixing circuit 76. Further, system data (AAUX, VAUX, and sub-code) generated by the system data processing circuit 63 is supplied to the mixing circuit 76. The mixing circuit 76 outputs record digital data, for example, at a transmission rate of 40.5 Mbps. Such record digital data is supplied to the record signal processing circuit 67 which for example, performs a digital modulating process and a record amplifying process. A record signal received from the record signal processing circuit 67 is supplied to the tape and head mechanism 33 for recording thereby on the magnetic tape.

The XDS decoder 71, which corresponds to decoder 36 in FIG. 14, detects the above-described XDS signal inserted into the 21-st line of the second field of the analog signal, decodes the CGMS in the detected XDS signal, and then generates the control or gating signals for the gate circuits 68 and 70. In other words, when the two bits of the CGMS are (11) for indicating that the copy operation is disabled, the gate circuits 68 and 70 are turned off or closed in response to the corresponding control or gating signal, and, the analog copy operation is prohibited. On the other hand, when the two bits of the CGMS are (00) for indicating that the copy operation is enabled, or when the two bits of the CGMS are (10) for indicating that the first copy generation is enabled, the gate circuits 68 and 70 are turned on or opened in response to the corresponding control or gating signal. Thus, the analog copy operation is permitted.

Information decoded by the XDS decoder 71 is supplied to the system data processing circuit 63 for determining the AAUX, VAUX, and sub-code included in the record digital data. In this case, the system data processing circuit 63 determines whether or not the CGMS is to be rewritten. In other words, when the two bits of the CGMS decoded by the XDS decoder 71 are (00) for indicating that the copy operation is enabled or permitted without restriction, the two bits added to the record data are not changed, but remain (00). However, when the two bits of the CGMS decoded by the XDS decoder 71 are (10) for indicating that only the first copy generation is enabled, and since the copy operation will have been performed once, the two bits to be added to the record data in the mixing circuit 76 are changed to (11). When the two bits of the CGMS decoded by the XDS decoder 71 are (11), the copy operation is prohibited thereby and it is not necessary to change the two bits of the CGMS added to the record data in the mixing circuit 76.

As described above, since the CGMS recorded on the tape is inserted in the XDS signal of the analog signal reproduced by the digital VCR 21, control can be correctly exercised whenever it is attempted to copy the reproduced analog signal by the digital VCR 22.

Figure 17:
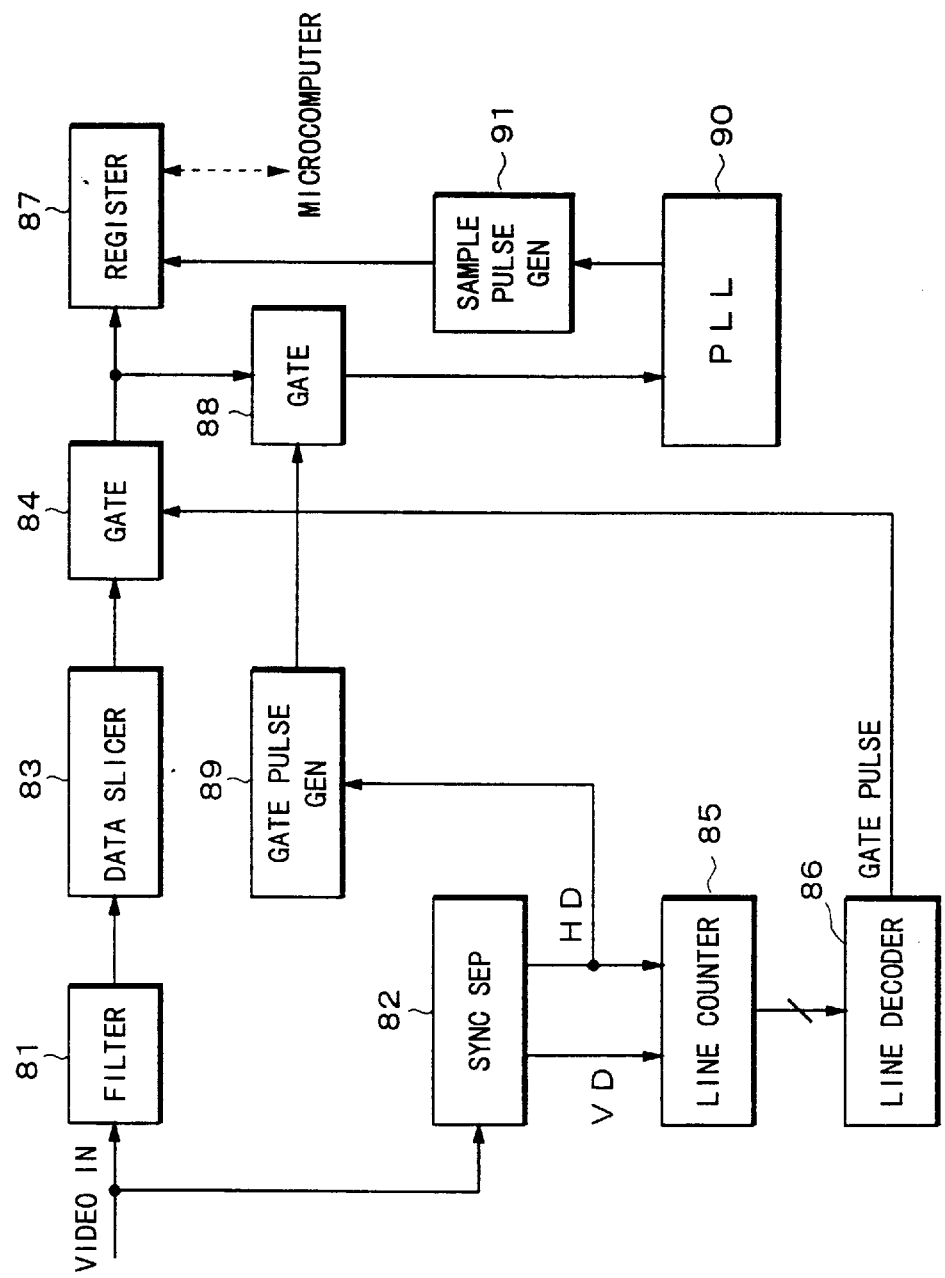
FIG. 17 is a block diagram showing an example of an XDS signal decoder that may be included in the VCR of FIG. 16.

FIG. 17 shows an example of a circuit arrangement that can be used in a digital VCR for the XDS decoder 10 shown in FIGS. 10A and 10B, or for the XDS decoder 71 shown in FIG. 16. In the XDS decoder of FIG. 17, a video input signal is supplied to a filter 81 and to a synchronous separating circuit 82. The filter 81 removes an unnecessary signal component in the frequency band between 2 MHz and 3 MHz. An output signal of the filter 81 is supplied to a data slicer 83 for digitizing by the latter. The digitized output signal of the slicer 83 is supplied to a gate circuit 84.

The synchronous separating circuit 82 separates the vertical synchronous signal VD and the horizontal synchronous signal HD from the video input signal. These synchronous signals VD and HD are supplied to a line counter 85 which counts the number of times the horizontal synchronous signal HD is received, and is reset by the vertical synchronous signal VD. The value of the count of the horizontal synchronous signal HD by the line counter 85 is supplied to a line decoder 86 which generates a gate pulse corresponding to the 21-st line of each field. The gate pulse is supplied to the gate circuit 84 so that the latter passes or selects the signal of the 21-st line of each field.

The gated output of the gate circuit 84 is supplied to a register 87 and to a gate circuit 88. A gate pulse generating circuit 89 receives the horizontal synchronous signal HD from separating circuit 82 and generates a gate pulse for selecting a run-in interval corresponding to such horizontal synchronous signal HD. The gate pulse is supplied from circuit 89 to the gate circuit 88 so that the latter outputs a run-in interval signal. A PLL 90 generates a clock signal that is in synchronization with the run-in interval signal from the gate circuit 88, and such clock signal is supplied to a sample pulse generating circuit 91.

The sample pulse from circuit 91 is applied to the register 87 and is used as a clock for causing the register 87 to acquire the XDS signal on the 21-st line of the second field of each frame containing such signal. A data sequence stored in the register 87 is decoded by a process in accordance with suitable software by a microcomputer. When the CGMS has been inserted into the XDS signal, the CGMS on the 21-st line of the second field is detected for each frame. The process by which the CGMS is recognized will be described later in detail. However, at this point, it is noted that, when the CGMS has been transmitted as part of the XDS signal in the manner described with reference to FIG. 7, it is determined whether the character 1 is (01h) (start) or (02h) (continue). When the character 1 is (01h) or (02h), it is determined whether or not the character 2 is (20h) to (2Fh) so as to thereby recognize the CGMS.

Figure 18:
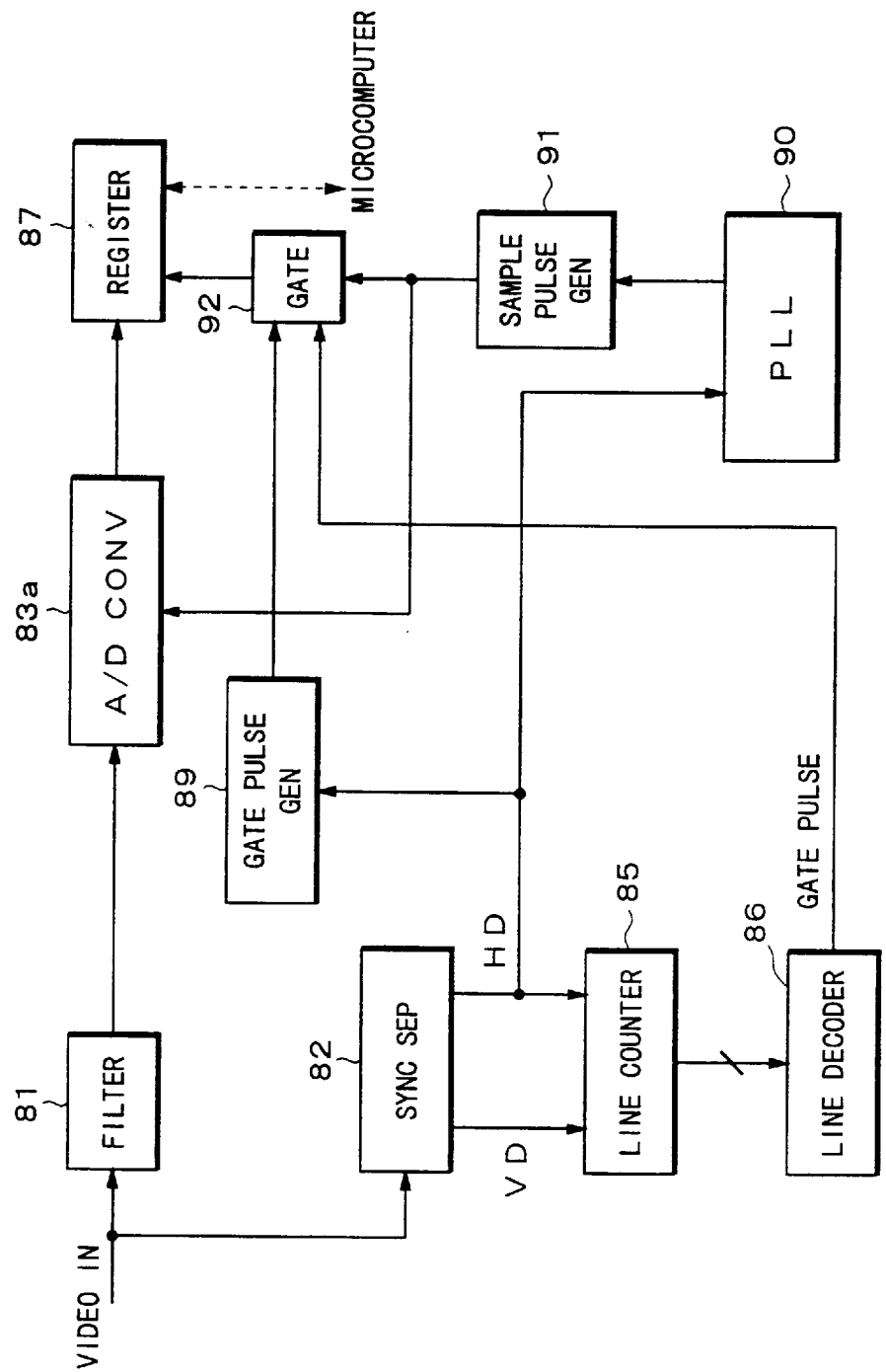
FIG. 18 is a block diagram showing another example of an XDS signal decoder.

FIG. 18 shows another arrangement that may be used for the XDS decoder, and in which components corresponding to those described with reference to FIG. 17 are identified by the same reference numerals. In FIG. 18, an input analog video signal is supplied through a filter 81 to an A/D converter 83*a*. The resulting digital signal is supplied to a register 87. A horizontal synchronous signal HD is supplied from a synchronous separating circuit 82 to a gate pulse generating circuit 89 and to a PLL 90. An output signal of the PLL 90 is supplied to a sample pulse generating circuit 91 and has a particular phase relation with the phase of the horizontal synchronous signal HD.

An output signal of the sample pulse generating circuit 91 is supplied to the A/D converter 83*a* and to a gate circuit 92. A pulse corresponding to the 21-st line is supplied from the gate pulse generating circuit 89 to the gate circuit 92 so that the latter then passes the sample pulse from circuit 91 to act as a clock for causing the register 87 to acquire the XDS signal on the 21-st line of each second or even-numbered field. When the sample pulse generated by the sample pulse generating circuit 91 has a particular frequency, the sample pulse may not always be locked to the horizontal synchronous signal.

Figure 19:
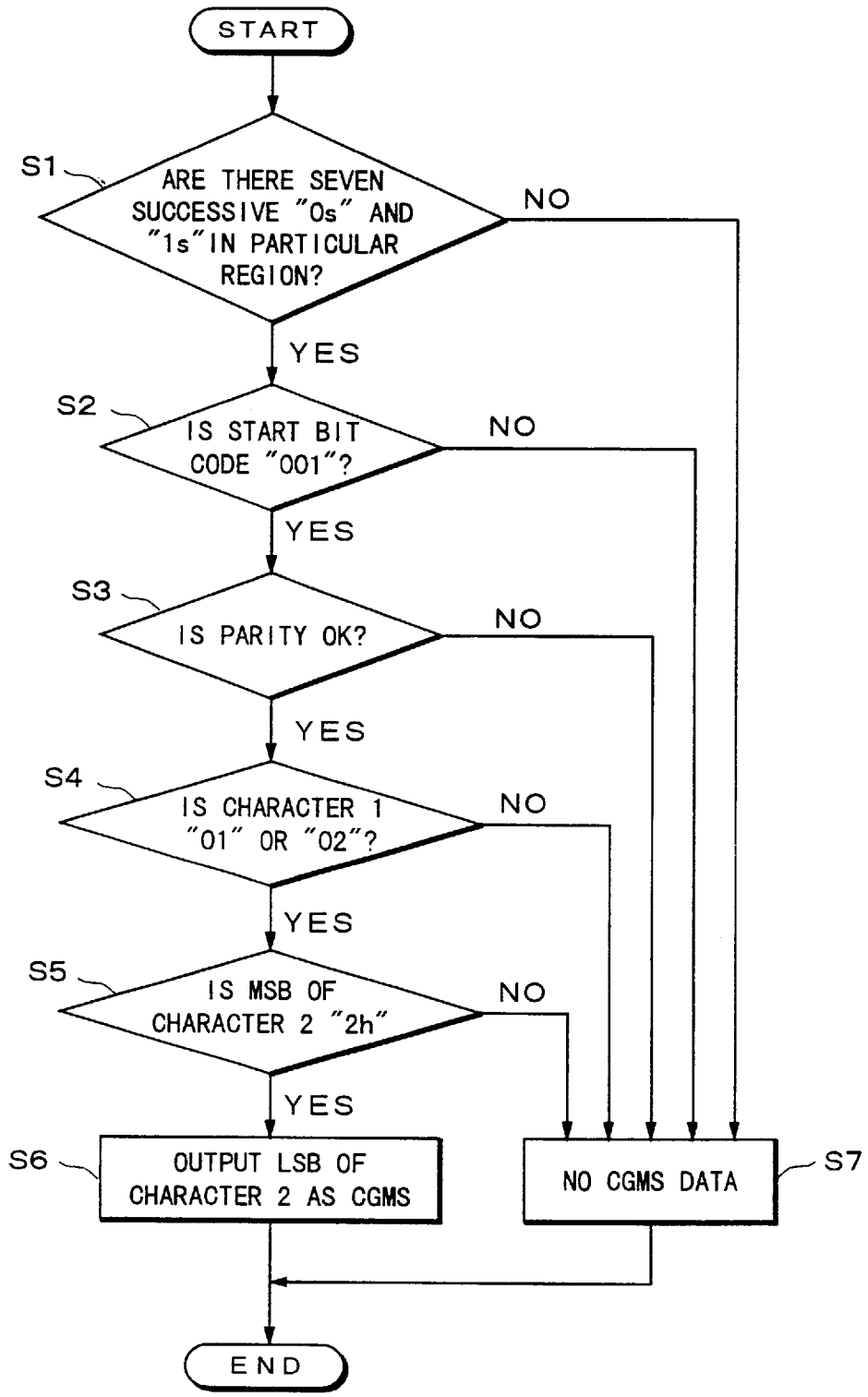
FIG. 19 is a flow chart showing an example of a program that may be employed in a microcomputer for recognizing CGMS information contained in the XDS signal.

FIG. 19 is a flow chart showing, by way of example, a program to be executed by a microcomputer for recognizing the CGMS in the XDS signal stored in the register 87 of FIG. 17 or 18. In this example, it is assumed that the DGMS is included in the format shown in FIG. 7. At step S1, it is determined whether or not there are seven successive "0 s" and "1s" appearing alternately in a particular region at the timing of the horizontal synchronous signal HD so as to thereby detect the presence of the clock run-in interval (FIG. 4). If the clock run-in interval is absent, that means the closed caption signal and the XDS signal are not present and, therefore, at step S7, it is determined that there is no CGMS data.

When the presence of the clock run-in interval is detected at step S1, the program advances to step S2. At step S2, it is determined whether or not the start bit code is (001). When the result of step S2 is NO, the program advances to step S7 wherein it is determined that the CGMS data is absent, and the program is completed. However, if at step S2, the start bit code (001) is detected, the program advances to step S3. At step S3, a parity check is performed with respect to parity bit p. When the result of the parity check in step S3 is NO, that is, the parity is not correct, the program proceeds to step 7, and the program is again completed. When the result of step S3 is YES, the program proceeds to step S4.

At step S4, it is determined whether the character 1 is 01h or 02h. When the character 1 is 01h or 02h, the flow advances to step S5. At step S5, it is determined whether or not the high order three bits (MSB) of the character 2 are 2h. When the determined result at step S5 is YES, the flow advances to step S6. At step S6, the low order four bits (LSB) of the character 2 are output as CGMS, for example, for controlling the recording operation of the digital VCR 22 as described above with reference to FIG. 16. When the determined result at step S4 or at step S5 is NO, the program proceeds to step S7 wherein it is determined that CGMS data is absent and after that, the process is completed.

The process of recognizing the CGMS illustrated in the flow chart shown in FIG. 19 is only an example. Thus, when the CGMS is superimposed on the XDS signal in another format, a software program corresponding to such other format will be performed.

In Japan, as in the USA, the NTSC signal is used as a standard TV signal. However, in Japan, since the 21-st line is used for a teletext broadcast, the VBI signal is inserted into the 20-th line so as to transmit the CGMS. Thus, in a digital VCR, the copy generation restriction is performed corresponding to the VBI signal. On the other hand, according to the embodiment of the present invention, the CGMS is inserted into the 21-st line of the XDS format. Thus, when a program recorded on a cassette tape corresponding to the present invention is recorded by a digital VCR that can only process the VBI signal, the copy generation restriction cannot be performed.

To solve such a problem, a digital VCR may have an arrangement for processing both the XDS signal and the VBI signal. In such arrangement, both an XDS decoder, for example, as at 36 in FIG. 14, and a VBI decoder are provide at the video input side. In addition, both an XDS encoder, for example, as at 26 in FIG. 14, and a VBI encoder are disposed on the video output side. However, in such an arrangement, two types of encoders and two types of decoders are required, thereby increasing the scale of the hardware and complicating the signal processing that is required. To solve these problems in a modification of the present invention, the video input side may have a device for decoding signals superimposed at the 20-th line and at the 21-st line of the analog input signal and for recognizing the VBI signal on the 20-th line with a higher precedence than the other. In addition, the video output side then may have only a VBI signal encoder and a structure by which the analog output signal of the digital VCR includes the CGMS only in the VBI signal. Thus, when the digital VCR has the decode function for the signal of the 21-st line only at the analog video input side, rights of broadcast providers and copyright owners can be protected.

If the CGMS included in a TV broadcast signal is (10) for indicating that the first copy generation is enabled, when this TV signal is recorded on the tape along with the CGMS that has been rewritten to (11) for indicating that the copy operation is disabled, and then the recorded video signal is reproduced from the tape with a digital VCR having the above described modification of the present invention, the CGMS is superimposed on the reproduced video signal in the format of the VBI signal. The VBI encoder of the digital VCR superimposes the CGMS on the 20-th line of the video signal and outputs the resultant signal. Since the recording side digital VCR recognizes the CGMS on the 20-th line with a higher precedence than the other CGMS, the copy operation of the recording side digital VCR is prohibited.

The record medium for recording an analog video signal in accordance with the present invention is not limited to a magnetic tape. Instead, other recording media, such as a magnetic disc, can be used.

By way of summary, in accordance with the present invention, copy generation restriction information, which may, for example, be based on copyrights, can be inserted into for example the XDS signal defined in association with the closed caption signal. Thus, the copyrights of broadcast providers can be protected. The CGMS can be included in the analog output signal that is output from a conventional set top box or IRD used in connection with digital TV broadcasts as well as from an analog TV receiver without the need to replace them. When the XDS format is used, the CGMS can co-exist with additional information being transmitted. When the VBI signal superimposed on the 20-th line is also used and the CGMS included in the VBI signal has a higher precedence than the CGMS included in the XDS format, even in a country such as Japan in which the CGMS cannot be superimposed in the 21-st line, the copyrights can be protected. In addition, the structure of the VCR can be simplified.

Although the present invention has been shown and described with respect to embodiments thereof which have been described in detail with reference to the accompanying drawings, it should be understood that the invention is not limited to those specific embodiments or the specifically described modifications thereof, and that various other changes, omissions, and modifications may be made therein by those skilled in the art without departing from the spirit and scope of the present invention as defined in the appended claims.

What is claimed is:

1. A method for transmitting a television signal having secondary information based on the format of closed caption XDS superimposed in a predetermined horizontal region of a vertical blanking interval in a digital format, comprising the steps of:

forming copy generation restriction information in association with the television signal which flags whether said television signal is recordable; and inserting said copy generation restriction information in association with the television signal into at least part of said predetermined horizontal region in which said secondary information has been superimposed.

2. A method for transmitting a television signal as in claim 1;

wherein said copy generation restriction information is inserted at a 21-st horizontal region of a vertical blanking interval of a second field, along with identification information for distinguishing said copy generation restriction information from said secondary information being superimposed on said television signal.

3. A method for transmitting a television signal as in claim 2;

wherein said format of the closed caption XDS includes a start bit code constituting said identification information for distinguishing said copy generation restriction information from said secondary information.

4. A method for transmitting a television signal as in claim 3, wherein said format of the closed caption XDS further includes a two-byte digital signal following said start bit code and comprised of first and second characters, and said copy generation restriction information is inserted in said second character.

5. A method for transmitting a television signal as in claim 1; in which said secondary information constitutes a text.

6. A method for recording a television signal having secondary information based on the format of closed caption XDS superimposed in a predetermined horizontal region of a vertical blanking interval in a digital data format, comprising the steps of:

forming copy generation restriction information in association with the television signal which flags whether said television signal is recordable; and inserting said copy generation restriction information in association with the television signal into at least part of said predetermined horizontal region in which the secondary information has been superimposed.

7. The method according to claim 6;

wherein said television signal includes picture information in said digital data format, and wherein said picture information is encoded as an analog television signal and said copy generation restriction information is superimposed in said predetermined horizontal region of a vertical blanking interval of said analog television signal.

8. The method according to claim 6;

wherein said copy generation restriction information is inserted at a 21-st horizontal region of a vertical blanking interval of a second field of said analog television signal, along with identification information for distinguishing said copy generation restriction information from said secondary information being superimposed on the television signal.

9. The method according to claim 8;

wherein said format of the closed caption XDS includes a start bit code constituting said identification information for distinguishing said copy generation restriction information from said secondary information.

10. The method according to claim 8;

wherein said format of the closed caption XDS further includes a two-byte digital signal following said start bit code and comprised of first and second characters, and said copy generation restriction information is inserted in said second character.

11. The method according to claim 6; wherein said secondary information constitutes a text.

12. An apparatus for recording a television signal having secondary information based on the format of closed caption XDS superimposed at a predetermined horizontal region of a vertical blanking interval in a digital data format and copy generation restriction information in association with the television signal inserted into at least part of said predetermined horizontal region at which the secondary information has been superimposed, comprising:

detecting means for detecting said copy generation restriction information; and controlling means for prohibiting recording of said television signal on a record medium when said detected copy generation restriction information indicates that the copy operation is disabled and for recording said television signal and said copy generation restriction information on said record medium when said detected copy generation restriction information indicates that the copy operation is enabled.

13. The apparatus according to claim 12;

wherein said detecting means is adapted for recognizing copy generation restriction information inserted at each of first and second horizontal regions in the vertical blanking interval of the television signal, the copy generation restriction information inserted at one of said first and second horizontal regions having a higher precedence than the copy generation restriction information inserted at the other of said first and second horizontal regions, and said controlling means being preferentially responsive to the copy generation restriction information that has said higher precedence.

14. The apparatus according to claim 13;

wherein said copy generation restriction information is inserted at a 21-st horizontal region of a vertical blanking interval of a second field [and is based on the format of a closed caption XDS], and said copy generation restriction information is also inserted at a 20-th horizontal region of the vertical blanking interval; and wherein said controlling means is preferentially responsive to said copy generation restriction information at said 20-th horizontal region.

15. The apparatus according to claim 12;

wherein said copy generation restriction information selectively has states indicating that copying is enabled without restriction, that only first copy generation is enabled, and that all copying is disabled, respectively, and further comprising means operative in response to detection of said copy generation restriction information in said state indicating that only first copy generating is enabled for changing said copy generation restriction information to said state indicating that all copying is disabled prior to recording said copy generation restriction information with said television signal on said record medium.

* * * * *